US005476127A

United States Patent [19]
Fournier

[11] Patent Number: 5,476,127
[45] Date of Patent: Dec. 19, 1995

[54] TIGHT-FITTING VEHICLE COVER

[76] Inventor: Vivian Fournier, 12081 Stanton Ave., Garden Grove, Calif. 92640

[21] Appl. No.: 300,696

[22] Filed: Sep. 1, 1994

Related U.S. Application Data

[63] Continuation-in-part of Ser. No. 104,354, Aug. 9, 1993, abandoned.

[51] Int. Cl.⁶ .................................................. B65D 65/02
[52] U.S. Cl. ............................................ 150/166; 296/136
[58] Field of Search .................................... 150/166, 168, 150/154; 296/136; 383/72

[56] References Cited

U.S. PATENT DOCUMENTS

| 2,994,356 | 8/1961 | Fleming | 150/166 |
|---|---|---|---|
| 3,763,908 | 10/1973 | Norman | 150/166 |
| 4,294,483 | 10/1981 | Ferris | 296/136 |
| 4,355,839 | 10/1982 | Rosen | 150/166 |
| 4,531,560 | 7/1985 | Balanky | 296/136 |
| 4,589,459 | 5/1986 | Lantrip | 296/136 |
| 4,635,996 | 1/1987 | Hirose | 296/136 |
| 4,795,207 | 1/1989 | Clarke | 296/136 |
| 4,799,728 | 1/1989 | Akers et al. | 296/136 |
| 4,889,171 | 12/1989 | Minimo | 150/166 |
| 4,952,007 | 8/1990 | Shahrokh | 296/136 X |
| 5,188,417 | 2/1993 | Curchod | 150/166 |
| 5,244,246 | 9/1993 | Cunningham | 296/136 |
| 5,273,316 | 12/1993 | Infante | 280/770 |

FOREIGN PATENT DOCUMENTS

| 861512 | 12/1953 | Germany | 63 C 45 |

*Primary Examiner*—Allan N. Shoap
*Assistant Examiner*—Christopher J. McDonald

[57] ABSTRACT

An apparatus is provided for a unique new cover for the upper portion of a vehicle including the roof and all windshields. The cover is comprised of a top portion that lays flat along the roof of a vehicle, a front and back panel that drape over the respective windshields and two side panels that are attached to the front, back and top panels. Connected to the side panels are fastening devices that allow the cover to adjust to vehicles of many different sizes. Cords stretch from the either the front, the back, or all four edges of the side panels to attatch to the under-side of the wheel wells by means of a hook or other fastening device. A belt is attached to each corner of each side panel. Each belt moves toward the center of the vehicle through a series of loops on the side panel. The two belts on each side meet and are fastened together at approximately mid-vehicle, pulling the cover down to snugly fit the contour of a particular vehicle. The top cover is also comprised of two flaps that are connected with both the edge of the side panel and the edge of the top panel. The flaps hang into the vehicle so that once the doors are shut and locked the cover becomes secured to the car, thereby helping prevent theft.

6 Claims, 2 Drawing Sheets

TIGHT-FITTING VEHICLE COVER

This application is a continuation in part of a pior application by the same inventor, Ser. No. 08/104,354 filed on Aug. 9, 1993, now abandoned. The present application is essentially identical to the former but written to more specifically describe and claim the invention.

FIELD OF THE INVENTION

This invention relates generally to a car top window weather protector and more particularly this invention relates to an improved car-top cover having means for locking the cover to the vehicle and means for tight-fitting the cover to a variety of vehicle sizes.

BACKGROUND OF THE INVENTION

Invention and use in the subject area is known to the public. As for example, U.S. Pat. No. 4,294,483 to Sean D. Ferris (1981) Inflatable Vehicle Cover is a vehicle cover designed for use on vehicles being moved in transit. It is comprised of at least one inflatable cell of flexible air-confining material that conforms to the configuration of the vehicle and has means for both inflating and securing said cover to vehicles. The deflated cover is placed over the vehicle, covering all exterior surfaces, and then secured around the vehicle by means of either elasticized circumference or perimeter-engaging straps. The cover is then inflated prior to transport. Upon arrival, the cover can be removed and stored for reuse. While this may be an effective method of vehicle protection while an automobile is in transit, it is not designed to provide convenient consistent protection on a daily basis.

U.S. Pat. No. 4,531,560 to Michael F. Balanky (1985) Protective Cover For Vehicles is another known design that specifically protects the finish of a vehicle by use of a hood cover, a pair of front body covers and a pair of rear body covers. The attaching means for each section is a plurality of spaced magnets around the perimeter of each section as well as several manually bendable tab clasps around the wheel well of the vehicle and at other suitable locations around the perimeter of the cover. The Vehicle Protective Cover, U.S. Pat. No. 4,589,459, to Larry J. Lantrip in 1986 is a design comprised of both a front and rear portion of the cover. The front portion includes a front panel, an attached hood panel and from side panels which are adapted to be detachably connected along the outside edge of the hood panel for nearly continuous coverage of the vehicle's hood and lower front side walls. The front side panels extend backward to overlap with the rear portion of the cover. The rear side panels are preferably connected at the rear and provided with adjustment so the rear side panels can be drawn taut against the vehicle. Extra cover portions can be included for vehicles with four doors, and fasteners can be used around the wheel wells and lower edges of the side panels to help secure the protective cover. U.S. Pat. No. 4,635,996 to Tokuzo Hirose (1987) Vehicle Body Cover is comprised of a covering sheet which is both waterproof and weatherproof: It is attached on its outer periphery to parts of the vehicle body so that the functions of the vehicle are not impaired and the doors are able to open and close freely. Yet another design is the Vehicle Cover. U.S. Pat. No. 4,795,207 to Edwin B. Clarke in 1989. This cover is designed specifically to protect small trucks such as vans and pickups. It is comprised of a central panel that attaches to a pair of side panels along the vehicle's length to form junction seams defining a pair of parallel vertical planes spaced apart by the width of the vehicle. While the prior art described above may be effective in protecting the finish and body work of various sized vehicles through use of various sections and means of attachment, they do not provide a compact, efficient means to easily and quickly protect a vehicles windshields and interior from the elements. The full car covers are inconvenient because of the bulk and weight of the cover. Not only are they difficult to handle, but their size also makes them nearly impossible to store easily. In addition, tying them down on the vehicle often has many steps which are time consuming, clumsy, and impractical, as they require bending or kneeling in order to reach under the car to secure the straps.

U.S. Pat. No. 4,889,171 to Ruben Minimo (1989) for a Foldable Weather Canopy For Motor Vehicles is a partial vehicle cover that improves upon much of the prior art. It is made of corrugated cardboard, laminated cardboard, vinyl, leather, nylon, plastic or any other material in which fold line impressions can be made in order to stretch and compress the cover. It includes a center portion and two side portions with belts on opposite ends of the sheet for securing the canopy to a car body. This collapsible canopy can be used as both a sunshade and frostshield when stretched across the upper exterior portion of a vehicle. But although this partial car cover design seems to avoid many of the pitfalls of the previously mentioned designs, it still differs significantly from the present invention as it is incapable of providing advantages such as a special theft-resistant flaps that are inserted inside locked doors, a size and weight small enough to be easily stored in a pouch within the car and an ability to be produced in a variety of bright colors and prints.

The present invention is an improvement over the prior art because it is light wieght and easy and efficient to use. It is able to fold up into a small pouch for convenient storage within the automobile. Also, the new invention has the ability to take the shape of many different sized vehicles and fit to them firmly. Finally, the new invention has two anti-theft flaps to allow the cover to be securd and locked to the vehicle, and therefore is a significant improvement over the prior art devices described above.

SUMMARY OF THE INVENTION

The present invention is a unique new cover for the upper portion of a vehicle including the top and all windshields. The cover is comprised of a top portion that lays flat along the roof of a vehicle, a front and back panel that drape over the respective windshields and two side panels that are attached to the front, back and top panels. Connected to the side panels are several different fastening devices. Cords stretch from the front and back edges of the side panels to attatch to the under-side of the car, preferably at the wheel wells, by means of a hook or other fastening device. Belts are attached at each end of each side panel and run through a series of belt loops that span the width of the side panels. When the two belts are pulled together to meet at approximately mid-vehicle, they pull the cover down tight to snugly cover the contour of the particular vehicle. The belts are then fastened together with velcro, a loop-type fastener or some other applicable means of fastening. Thus it is an object of the present invention to adjust and tighten to a wide variety of different sized vehicles by means of this system of cords and belts.

Another key feature of the new invention are the two flaps that at the seams of the top panel and each side panel. These flaps are long enough to hang down into the car, allowing the car door to be closed and then locked. This secures the cover to the vehicle so as to prevent theft of the cover and provide safe use both day and night.

It is also an object of this invention to provide a cover posessing a light-weight, compact structure. This feature makes the invention small enough for easy storage in a pouch that can be kept inside a vehicle or its trunk.

Another object of this invention is to improve upon the system of fastening a cover to a vehicle. The cords, belts and loops make application and removal of the cover a more efficient process that can be completed in a matter of minutes. This lends the cover more readily for convenient every-day use, while at work or at home.

Besides merely keeping the moisture and dust off a vehicle's windows, it is an object of the invention to prevent snow and frost from building up on the windshields and roof. This will greatly reduce the time it takes to prepare a vehicle for use in inclement weather. It is also an object of the cover to protect the vehicle's interior, such as the dashboard and upholstery, from the damaging UV rays of the sun. Meanwhile the cover will help reduce the uncomfortable heat build-up inside a vehicle. In fact, the cover could be made of a special thermal-reflectant material to keep the effects of the sun to a bare minimum. In dry climates the cover can be made of a pourous material to allow moisture between the vehicle and the cover to escape. In regions with significant rain or snow fall, the cover can be made of a water resistant material to prevent rain, snow, frost and ice from contacting the windshield surface. And finally, this invention could be constructed from a material that can be produced in a variety of colors and prints.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
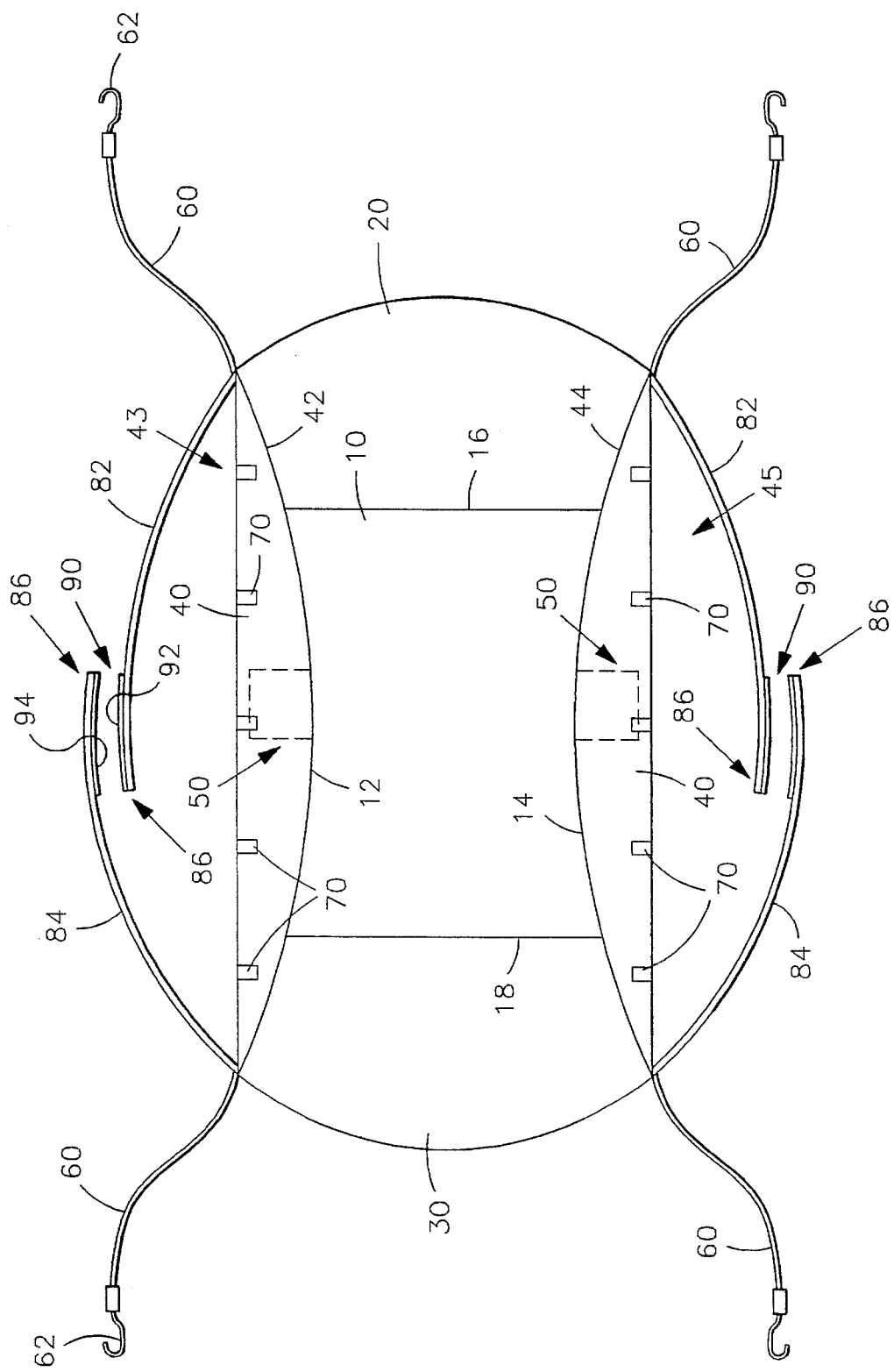
FIG. 1 is a plan view of the invention showing the flaps used to prevent theft as well as the cording, hooks, belts and loops used for attachment and adjustment to many different sized vehicles.
Figure 2A:
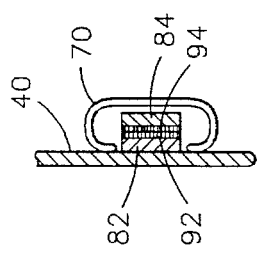
FIG. 2A is a cross-sectional view of the invention of FIG. 1 taken along line 2A—2A showing details of the joined belts within a loop.
Figure 2:
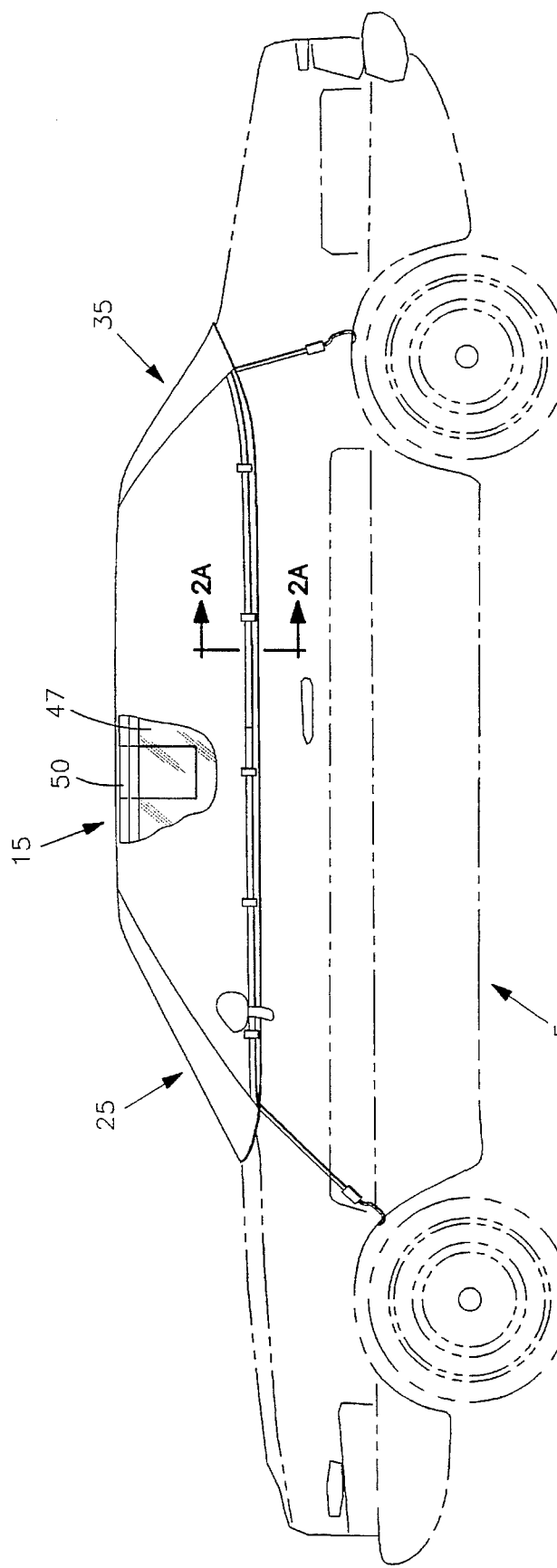
FIG. 2 is a left side elevational view, of the invention of FIG. 1 as attached to a vehicle.

FIGS. 1 and 2 show a removable cover for a vehicle 5 such as a automobile or a truck, consisting of several panels. A top panel 10 covers a top portion 15 of the vehicle 5, primarily the roof. It has left 12 and right 14 side edges as well as front 16 and rear 18 edges defining its general shape. A front window panel 20 the size and shape necessary to cover the front window 25 of a vehicle 5 is attached to the top panel 10 at the front edge 16. At the rear edge 18, the top panel 10 connects to a rear window panel 30, which is a size and shape necessary to cover a rear window 35 of the vehicle 5. A pair of side panels 40 join with the top panel 10 on both the left 43 and right 45 sides. These panels are the size and shape for covering the side windows 47 of vehicle 5 and thus attach to the front 20 and rear 30 window panels on the left 42 and right 44 sides.

A cover locking flap 50 connects edge-to-edge at the seam where each side panel 40 is attached to the side of the top panel 10. The flaps are long enough to be tucked into the left and right doors on their respective sides with the corresponding side panel 40 laying over the flap 50. These flaps 50 provide a method of locking the cover to a vehicle 5.

The cover also includes two pairs of elastic cords 60, perferably one extending from each of the four sides of the cover. Other variations of the cord 60 configuration would be to have only one set of cords 60 which could both be at the front of vehicle 5, or both at the rear, or one located at the front of one side panel 40 and the other located at the rear of the opposite side panel 40. At the end of each cord 60 is a fastener such as a hook 62 to attach to the edge of a vehicle 5, preferably at the wheel well, to hold the cover in place. As a means to further secure the cover to a vehicle 5, each side panel 40 has a row of horizontal belt-type loops 70 and a pair of front 82 and rear 84 flexible attachment belts. The front belts 82 are attached to the side panels 40 adjacent the front window panel 20. The rear belts 84 are fixed to the side panels 40 adjacent the rear window panel 30. The unattached end of belts 82 and 84 pass through the loops 70 and join with the other at distal ends 86. The belts 82 and 84 are then fastened together with a joining means 90, preferably a hook 92 or loop 94 type fastener, although Velcro, ties, buckles or other fastening devices may also suffice. These belts 82 and 84 can be fastened at a selected tightness that will hold the cover firmly in place around the sides of vehicle 5. FIG. 2A shows an enlarged cross-sectional view of the belts 82 and 84 through the fastening loop 94.

The cover may be made of a flexible sheet stock material of a porous nature for allowing moisture caught between the cover and the vehicle to escape. It may also be made of a water proof or impermeable material in order to prevent moisture from rain, condensation, dew etc. from reaching the vehicle.

FIG. 2A clearly shows the details of how belts 82 and 84 are fastened together with the hook and loop fastening material 92, 94 and the relative position of the belts, 82, 84, loops 70 and the side panel 40.

The procedure for covering the vehicle 5 is to spread top panel 15 across the center top of vehicle 5 and roll half of top panel 15 to the bottom of the front windshield 25, then roll the other half of the top panel 15 from the center top of vehicle 5 down to the bottom of the rear window 35. The flaps 50 will then be in view. Open each front door and insert flaps 50 inside vehicle 5. Close and lock the doors. Unfold each side panel 40 down to cover windows on each side of vehicle 5. Take front strap 82 and guide it through loops 70 to the center. Put strap 84 of the same side of vehicle 5 through loops 70 to the center. Then fasten straps 82 and 84 to each other by means of a hook 92 or belt-type fastener 94. Repeat this process with straps 82 and 84 on the opposite side panel 40 of vehicle 5.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A removable cover for a vehicle comprising:

a top panel covering a top portion of the vehicle, providing left and right side edges and front and rear edges;

a front window panel integral with and contiguous to the top panel at the front edge thereof, of a size and shape for covering a front window of the vehicle;

a rear window panel integral with and contiguous to the top panel at the rear edge thereof, of a size and shape for covering a rear window of the vehicle;

a pair of side panels integral with and contiguous to the top panel on left and right sides respectively thereof, and further integral and contiguous with left and right sides of the front and rear window panels respectively, of a size and shape for covering the side windows of the vehicle, the side panels each further including a plurality of belt-type loops arranged in a horizontal row thereon, and a pair of front and rear flexible attachment belts having one end fixed to the side panels adjacent the front and rear window panels respectively, the other ends engaging the loops and mutually joined to one another;

a pair of cover locking flaps integral with and contiguous to the top panel on either side thereof, adjacent to the side panels respectively, and of a length adequate to be tucked into a left and right doors respectively, of the vehicle, for locking the cover to the vehicle, each of the side panels laying over the respective locking flap.

2. The cover of claim 1 further including at least one pair of elastic cords extending from the cover on either side thereof, each of the cords terminating with a hook for engaging the vehicle for holding the cover in place thereon.

3. The cover of claim 1 wherein the distal ends of the attachment belts include a joining means providing for mutually joining the attachment belts at a selected tightness around the sides of the vehicle to hold the cover tightly thereto.

4. The cover of claim 3 wherein the joining means is a hook and loop type fastener material.

5. The cover of claim 1 wherein the cover is made of a flexible sheet stock material of a porous nature.

6. The cover of claim 1 wherein the cover is made of a flexible sheet stock material of a water impermeable nature.

* * * * *